US009432391B2

(12) United States Patent
Wang et al.

(10) Patent No.: US 9,432,391 B2
(45) Date of Patent: Aug. 30, 2016

(54) METHOD, DEVICE AND APPARATUS FOR ACQUIRING SECURITY STATE OF MOBILE TERMINAL

(71) Applicant: Tencent Technology (Shenzhen) Company Limited, Guangdong (CN)

(72) Inventors: Qing Wang, Guangdong (CN); Haoran Guo, Guangdong (CN); Quanhao Xiao, Guangdong (CN); Yixia Yuan, Guangdong (CN); Jiashun Song, Guangdong (CN); Pengtao Li, Guangdong (CN); Xunchang Zhan, Guangdong (CN); Chunyou Lin, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 4 days.

(21) Appl. No.: 14/576,379

(22) Filed: Dec. 19, 2014

(65) Prior Publication Data

US 2015/0106945 A1 Apr. 16, 2015

Related U.S. Application Data

(63) Continuation of application No. PCT/CN2013/077910, filed on Jun. 25, 2013.

(30) Foreign Application Priority Data

Jun. 28, 2012 (CN) .......................... 2012 1 0218435

(51) Int. Cl.
*H04L 29/00* (2006.01)
*H04L 29/06* (2006.01)
*G06F 21/50* (2013.01)
*H04W 12/00* (2009.01)

(52) U.S. Cl.
CPC .......... *H04L 63/1433* (2013.01); *G06F 21/50* (2013.01); *H04L 63/06* (2013.01); *H04L 63/12* (2013.01); *H04W 12/00* (2013.01)

(58) Field of Classification Search
CPC ............................... H04L 63/14; G06F 21/05
USPC ....................................................... 726/22–25
See application file for complete search history.

(56) References Cited

U.S. PATENT DOCUMENTS

| 8,955,107 | B2* | 2/2015 | Eyada ................. | H04L 63/0263 726/1 |
| 2012/0185910 | A1* | 7/2012 | Miettinen ............... | G06F 21/31 726/1 |
| 2013/0035062 | A1* | 2/2013 | Vered .................... | H04W 12/12 455/410 |

* cited by examiner

*Primary Examiner* — Madhuri Herzog
(74) *Attorney, Agent, or Firm* — Frommer Lawrence & Haug LLP; William S. Frommer

(57) ABSTRACT

Disclosed are a method, device and apparatus for acquiring the security state of a mobile terminal, which belong to the field of computers. The method includes: acquiring state information about key indicators preset by a mobile terminal; conducting a security level assessment on each key indicator through assessment policies corresponding to each of the preset key indicators, according to the state information about the key indicators, to obtain a first assessment result; and endowing each key indicator with a specific weight value, conducting an overall level assessment on the overall security state of the mobile terminal, and according to the weight value of each of the key indicators and the first assessment result of each of the key indicators, to obtain a second assessment result expressing the overall security state of the mobile terminal. The device includes: an acquiring module, a first assessment module and a second assessment module.

16 Claims, 3 Drawing Sheets

| |
|---|
| The overall security state of the mobile is a dangerous state a score of the mobile terminal is 60; advise immediate processing |
| Software in running: Include 6 software in running |
| Junk file: a storage size occupied by the junk files is 39MB |
| Malicious software: include 3 malicious software |
| Power management: capacity of a battery of the mobile terminal is 60% |
| Bluetooth state: Bluetooth state of the mobile terminal is an open state |

FIG. 3

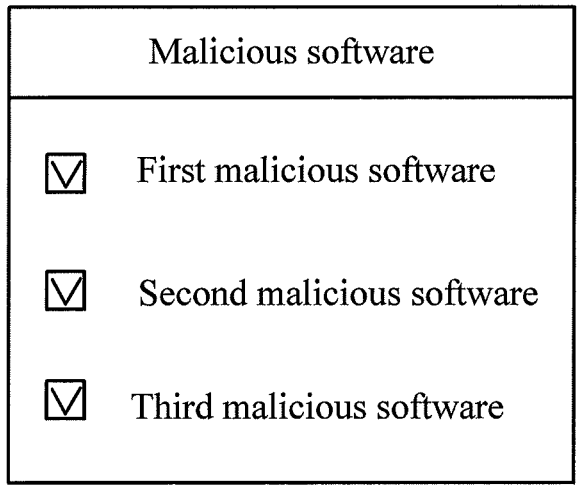

FIG. 4

METHOD, DEVICE AND APPARATUS FOR ACQUIRING SECURITY STATE OF MOBILE TERMINAL

CROSS-REFERENCE TO RELATED APPLICATIONS

The present application is a Continuation application of PCT Patent Application No. PCT/CN2013/077910, filed on Jun. 25, 2013, which claims the benefit of priority of China Patent Application No. 201210218435.4 filed in the Chinese Patent Office on Jun. 28, 2012, and entitled "METHOD, DEVICE AND APPARATUS FOR ACQUIRING SECURITY STATE OF MOBILE TERMINAL", the contents of which are hereby incorporated by reference in their entireties.

FIELD

The present disclosure relates to the field of computers, and particularly to a method, a device, and an apparatus for acquiring security state of a mobile terminal.

BACKGROUND

With the development of mobile communication technology, especially with the popularization and application of 3G network and smart phones, mobile phone application markets based on various platforms are greatly developed. An increment of mobile applications not only brings rich functionalities and new experiences to a user, but also results in new problems and challenges to operations of the smart phone.

In the existing technology, the user usually can prevent and eliminate potential security problems of the mobile phone according to health state when the mobile phone is running. A security state of the smart phone can be obtained by using detection software and own experiences of the user. In detail, various key indicators are predefined in the detection software; the key indicators may be, such as, "software in running", "junk file", and "malicious software". The detection software can automatically detect the key indicators and obtain corresponding state information of each key indicator. For example, the number of the malicious software included in the state information of the key indicator "malicious software" can be detected. The state information of each key indicator can be displayed to the user, and then the user can determine whether or not the overall security state of the smart phone is in a good condition according to the state information of each key indicator and the own experiences of the user.

In the existing technology, at least the following question is found by the inventor during the process of realizing the present invention.

Since the overall security state of the smart phone is determined only relying on the experiences of the user, so that the accuracy of the overall security state of the mobile phone is too low, therefore reducing the user experience.

SUMMARY

In order to accurately obtain the overall security state of a mobile terminal and improve the user experience, a method, a device and an apparatus for acquiring a security state of a mobile terminal are provided. Technical proposals of the present disclosure are described as follows.

A method for acquiring security state of a mobile terminal, comprising:

acquiring state information about key indicators preset by a mobile terminal;

conducting a security level assessment on each key indicator through assessment policies corresponding to each of the key indicators, to obtain a first assessment result, according to the state information about the key indicators; and endowing each key indicator with a specific weight value, conducting an overall level assessment on the overall security state of the mobile terminal, and acquiring a second assessment result which expresses the overall security state of the mobile terminal according to the weight value of each of the key indicators and the first assessment result of each of the key indicators.

Wherein the step of conducting an overall level assessment on the overall security state of the mobile terminal, and acquiring a second assessment result which expresses the overall security state of the mobile terminal according to the weight value of each of the key indicators and the first assessment result of each of the key indicators comprises:

determining the first assessment result of each key indicator which is pre-appointed, setting the second assessment result which expresses the overall security state of the mobile terminal to a dangerous state, if there is a key indicator whose first assessment is in a dangerous state in the key indicators assigned in the key indicator list;

setting the second assessment result which expresses the overall security state of the mobile terminal to a warning state, if the key indicators assigned in the key indicator list include any key indicator whose first assessment result is in a warning state but not include the key indicator whose first assessment result is in a dangerous state;

acquiring a second assessment result which expresses the overall security state of the mobile terminal according to the weight value of each key indicator included in the key indicator list, if the key indicators assigned in the key indicator list do not include any key indicator whose first assessment result is in a dangerous state and do not include any key indicator whose first assessment result is in a warning state.

Wherein the step of acquiring a second assessment result which expresses the overall security state of the mobile terminal according to the weight value of each key indicator included in the key indicator list comprises:

figuring out a calculation result of each key indicator according to the weight value of each key indicator and a weight coefficient corresponding to each key indicator, and acquiring a score of the mobile terminal by summing all the calculation results of the key indicators;

determining a score range which the score of the mobile terminal belongs to, acquiring the second assessment result corresponding to the score rage, and setting the second assessment result corresponding to the score range to a second assessment result which is used to express the overall security state of the mobile terminal.

Wherein after the step of acquiring a second assessment result which expresses the overall security state of the mobile terminal, the method further comprising:

displaying the second assessment result which expresses the overall security of the mobile terminal and the state information of each key indicator.

After the step of displaying the second assessment result which expresses the overall security of the mobile terminal and the state information of each key indicator, further comprising:

acquiring the processing strategy corresponding to the key indicator from a prestored corresponding relationship between the key indicator and the processing strategy, when the user selects the key indicator which needs to be processed, and submit a processing command.

A device for acquiring security state of a mobile terminal, comprising:

an acquiring module configured to acquire state information about key indicators preset by a mobile terminal;

a first assessment module configured to conduct a security level assessment on each key indicator through assessment policies corresponding to each of the key indicators, to obtain a first assessment result, according to the state information about the key indicators;

a second assessment module configured to endow each key indicator with a specific weight value, conduct an overall level assessment on the overall security state of the mobile terminal to acquire a second assessment result which expresses the overall security state of the mobile terminal according to the weight value of each of the key indicators and the first assessment result of each of the key indicators.

the second assessment module comprises:

an endowing unit configured to endow each key indicator with a specific weight value;

a first setting unit configured to determine the first assessment result of each key indicator which is pre-appointed, set the second assessment result which expresses the overall security state of the mobile terminal to a dangerous state, if there is a key indicator whose first assessment is in a dangerous state in the key indicators assigned in the key indicator list;

a second setting unit configured to set the second assessment result which expresses the overall security state of the mobile terminal to a warning state, if the key indicators assigned in the key indicator list include any key indicator whose first assessment is in a warning state but not include the key indicator whose first assessment result is in the dangerous state; and an acquiring unit configured to acquire a second assessment result which expresses the overall security state of the mobile terminal according to the weight value of each of the key indicators assigned in the key indicator list, if the key indicators assigned in the key indicator list do not include any key indicator whose first assessment result is in a dangerous state and do not include any key indicator whose first assessment result is in a warning state.

the acquiring unit comprises:

a calculating sub-unit configured to figure out a calculation result of each key indicator according to the weight value of each key indicator and a weight coefficient corresponding to each key indicator, and acquire a score of the mobile terminal by summing all the calculation results of the key indicators; and a setting sub-unit configured to determine a score range which the score of the mobile terminal belongs to, acquire the second assessment result corresponding to the score range, and set the second assessment result corresponding to the score range to a second assessment result which is used to express the overall security state of the mobile terminal.

The device for acquiring security state of mobile terminal further comprising:

a displaying module configured to display the second assessment result which expresses the overall security of the mobile terminal and the state information of each key indicator.

The device for acquiring security state of mobile terminal further comprising:

a processing module configured to acquire the processing strategy corresponding to the key indicator from a prestored corresponding relationship between the key indicator and the processing strategy, when the user selects the key indicator which needs to be processed, and submit a processing command.

An apparatus for acquiring security state of a mobile terminal, comprising:

a memory; one or more than one programs stored in the memory for execution by one or more than one processors, the one or more than one programs comprising instructions for:

acquiring state information about key indicators preset by a mobile terminal;

conducting a security level assessment on each key indicator through assessment policies corresponding to each of the key indicators, to obtain a first assessment result, according to the state information about the key indicators; and endowing each key indicator with a specific weight value, and conducting an overall level assessment on the overall security state of the mobile terminal to acquire a second assessment result which expresses the overall security state of the mobile terminal according to the weight value of each of the key indicators and the first assessment result of each of the key indicators.

In the embodiment of the present disclosure, the state information about key indicators preset by the mobile terminal is acquired. The security level assessment on each indicator through assessment policies corresponding to each key indicator is conducted according to the state information about the key indicators to further obtain a first assessment result. Each key indicator is endowed with a specific weight value, and an overall level assessment on the overall security state of the mobile terminal according to the weight value of each key indicator and the first assessment result of each of the key indicators is conducted, to acquire a second assessment result which is used to express the overall security state of the mobile terminal. In the present disclosure, the second assessment result is automatically acquired according to the weight value of each key indicator and the first assessment result of each of the key indicators, so that, the overall security state of the mobile terminal is accurately acquired, and the user experience is improved.

BRIEF DESCRIPTION OF THE DRAWINGS

In order to make embodiments of present disclosure more clearly, the drawings which are needed in the embodiments of present disclosure are described simply as follows. It is obviously, the drawings described as the follows are only exemplary embodiments of present disclosure. To a person of ordinary skill in the art, under premise of no creative work, other drawings may be obtained according to the drawings.

FIG. 3 is a state schematic diagram of a first mobile terminal provided in a second embodiment of present disclosure.

FIG. 4 is a state schematic diagram of a second mobile terminal provided in a second embodiment of present disclosure.

DETAILED DESCRIPTION OF ILLUSTRATED EMBODIMENTS

Further descriptions of present disclosure will be illustrated clearly and completely, which is combined with embodiments in drawings and detailed embodiments.

A First Embodiment

Figure 1:
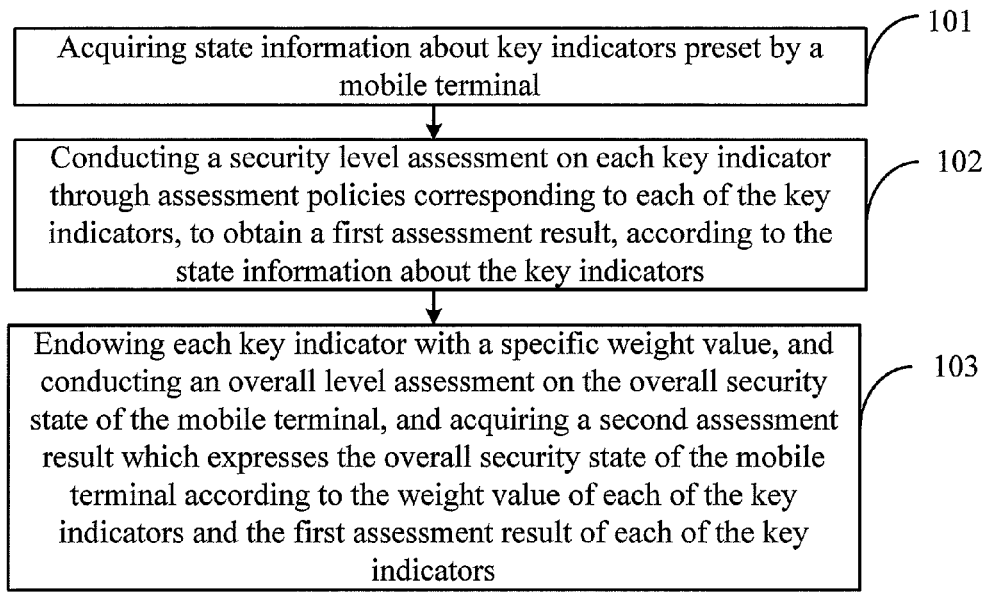
FIG. 1 is a flowchart of a method for acquiring security state of a mobile terminal provided in a first embodiment of present disclosure.

Referring to FIG. 1, FIG. 1 is a flowchart of a method for acquiring security state of a mobile terminal provided in a first embodiment of present disclosure. The method for acquiring security state of a mobile terminal at least includes the following steps.

Step 101, acquiring state information about key indicators preset by a mobile terminal.

Step 102, conducting a security level assessment on each key indicator through assessment policies corresponding to each of the key indicators, to obtain a first assessment result, according to the state information about the key indicators.

Step 103, endowing each key indicator with a specific weight value, conducting an overall level assessment on the overall security state of the mobile terminal, and acquiring a second assessment result which expresses the overall security state of the mobile terminal according to the weight value of each of the key indicators and the first assessment result of each of the key indicators.

In the embodiment of the present disclosure, the state information about key indicators preset by the mobile terminal is acquired. The security level assessment on each indicator through assessment policies corresponding to each key indicator is conducted according to the state information about the key indicators to further obtain a first assessment result. Each key indicator is endowed with a specific weight value, and an overall level assessment on the overall security state of the mobile terminal according to the weight value of each key indicator and the first assessment result of each of the key indicators is conducted, to acquire a second assessment result which is used to express the overall security state of the mobile terminal. In the present disclosure, the second assessment result is automatically acquired according to the weight value of each key indicator and the first assessment result of each of the key indicators, so that, the overall security state of the mobile terminal is accurately acquired, and the user experience is improved.

A Second Embodiment

Figure 2:
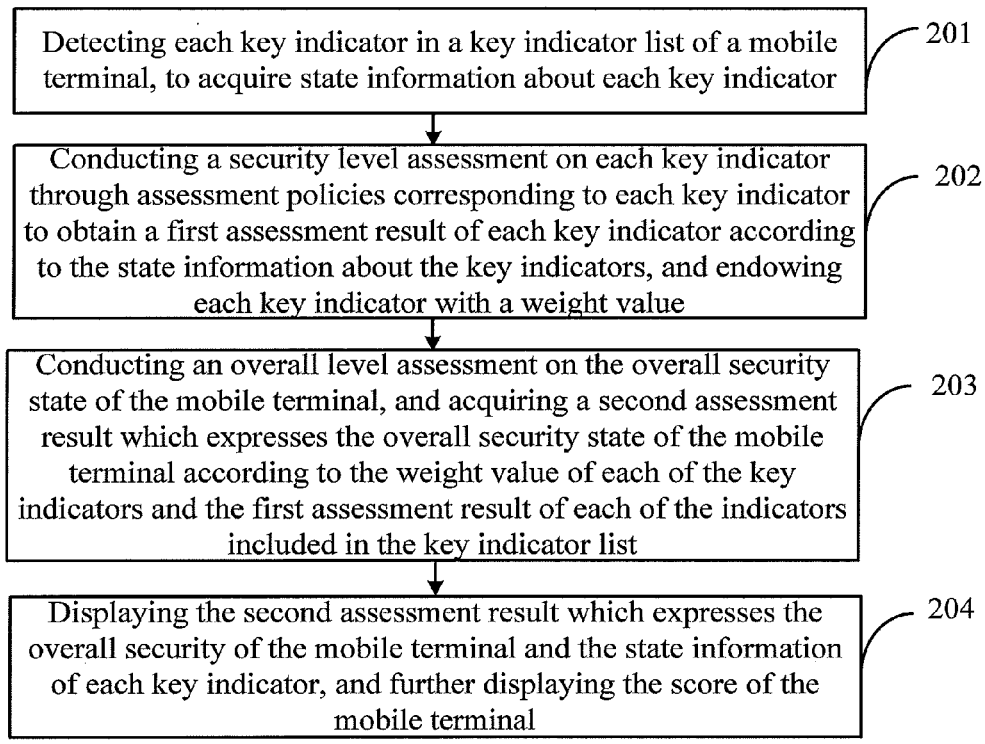
FIG. 2 is a flowchart of a method for acquiring security state of a mobile terminal provided in a second embodiment of present disclosure.

Referring to FIG. 2, FIG. 2 is a flowchart of a method for acquiring security state of a mobile terminal provided in a second embodiment of present disclosure. The method for acquiring security state of a mobile terminal at least includes the following steps.

Step 201, detecting each key indicator in a key indicator list of a mobile terminal, to acquire state information about each key indicator.

The key indictor is a critical indictor which can effect operations and/or performances of the mobile terminal. One or more than one key indictors can be predefined in the mobile terminal by a technical person, and the key indictors which are predefined are stored in the key indicator list; or, one or more than one key indictors can be predefined by the user, and the key indictors which are predefined are stored in the key indicator list.

Referring to table 1, the table 1 is taken here as an example. The key indictors included in the key indicator list of the mobile terminal include, but not limited to: "software in running", "junk file", "malicious software", "power management", and "Bluetooth state".

TABLE 1

| key indicators |
| --- |
| software in running |
| junk file |
| malicious software |
| power management |
| Bluetooth state |

Beginning from the first key indicator of the key indicator list as shown in table 1, each key indicator in the key indicator list is detected in turn, so as to obtain the state information of each key indicator. The state information of each key indicator is described in detail as follows.

When the key indicator "software in running" is detected, the state information corresponding to the key indicator "software in running" is detected, and the state information corresponding to the key indicator "software in running" includes the number of software in running to be 6. When the key indicator "junk file" is detected, then the state information corresponding to the key indicator "junk file" is detected, and the state information corresponding to the key indicator "junk file" includes the storage space occupied by junk files to be 39 mega bytes (MB). Furthermore, the state information corresponding to the key indicator "junk file" may also include the number of the junk files. When the key indicator "malicious software" is detected, then the state information of the key indicator "malicious software" is detected, and the state information of the key indicator "malicious software" includes that the number of the malicious software is 3. When the key indicator "power management" is detected, then the state information of the key indicator "power management" is detected, and the state information about the key indicator "power management" includes that the state of charge (SOC) of a battery of the mobile terminal is 60%. When the key indicator "Bluetooth state" is detected, then the state information of the key indicator "Bluetooth state" is detected, and the state information of the key indicator "Bluetooth state" includes that the Bluetooth state of the mobile terminal is in startup mode.

Step 202, conducting a security level assessment on each key indicator through assessment policies corresponding to each key indicator to obtain a first assessment result of each key indicator according to the state information about the key indicators, and endowing each key indicator with a weight value.

In detail, the assessment policies corresponding to each key indicator can be obtained according to a prestored corresponding relationship between each key indicator and the assessment policies corresponding to each key indicator. A first assessment result of each key indicator can be obtained through the assessment policies corresponding to each of the key indicators, according to the state information about each of the key indicators, and each key indicator is endowed with a weight value.

Each key indicator corresponds to a total weight value, and the sum of the total weight values of all the key indicators is equate to a total score corresponding to the mobile terminal.

For example, supposing that a total score corresponding to the mobile terminal is 100, a total score corresponding to the key indicator "software in running" is 30, a total score corresponding to the key indicator "junk file" is 30, and a total score corresponding to the key indicator "malicious software" is 30, and a total score corresponding to the key indicator "power management" is 5, and a total score corresponding to the key indicator "Bluetooth state" is 5.

Assessment policies corresponding to each key indicator are preset in advance, and a corresponding relationship between each key indicator and the assessment policies corresponding to each key indicator is stored. For example, the assessment policies corresponding to the key indicator "software in running" include a plurality of number ranges; each number range corresponds to a weight value and a first assessment result. Assuming that the assessment policies corresponding to the key indicator "software in running" include five number ranges. The five number ranges are: a first number range, a second number range, a third number range, a fourth number range, and a fifth number range. The first number range is [0, 3], the weight value corresponding to the first number range [0, 3] is 30, and the first assessment result corresponding to the first number range [0, 3] is a security state. The second number range is [4, 7], the weight value corresponding to the second number range [4, 7] is 24, and the first assessment result corresponding to the second number range [4, 7] is a security state. The third number range is [8, 9], the weight value corresponding to the third number range [8, 9] is 18, and the first assessment result corresponding to the third number range [8, 9] is a warning state. The fourth number range is [10, 12], the weight value corresponding to the fourth number range [10, 12] is 12, and the first assessment result corresponding to the fourth number range [10, 12] is a warning state. The fifth number range is greater than or equal to 13, the weight value corresponding to the fifth number range is 6, and the first assessment result corresponding to the fifth number range is a dangerous state.

Correspondingly, the assessment policies corresponding to the key indicator "software in running" are obtained according to the prestored corresponding relationship between each key indicator and the assessment policies corresponding to each key indicator. According to the state information corresponding to the key indicator "software in running", the number of software in running is detected to be 6, and the first assessment result corresponding to the key indicator "software in running" is the security state according to corresponding assessment policies, and the key indicator "software in running" is endowed with a weight value of 24.

The assessment policies corresponding to the key indicator "junk file" include a plurality of storage space ranges. Each storage space range corresponds to a weight value and a first assessment result. Supposing that the assessment policies corresponding to the key indicator "junk file" include three storage space ranges. The three storage space ranges include: a first storage space range, a second storage space range, and a third storage space range. The first storage space range is [0, 50M], the weight value corresponding to the first storage space range [0, 50M] is 30, and the first assessment result corresponding to the first storage space range [0, 50M] is a security state. The second storage space range is [51M, 150M], the weight value corresponding to the second storage space range [51M, 150M] is 20, and the first assessment result corresponding to the second storage space range [51M, 150M] is a warning state. The third storage space range is greater than or equal to 151M, the weight value corresponding to the third storage space range is 10, and the first assessment result corresponding to the third storage space range is a dangerous state.

Correspondingly, the assessment policies corresponding to the key indicator "junk file" are obtained according to the prestored corresponding relationship between each key indicator and the assessment policies corresponding to each key indicator. According to the state information corresponding to the key indicator "junk file", the storage space of the junk files is detected to be 39 MB, and the first assessment result corresponding to the key indicator "junk file" is the security state according to corresponding assessment policies, and the key indicator "junk file" is endowed with a weight value of 30.

The assessment policies corresponding to the key indicator "malicious software" are defined as follows. If the mobile terminal has malicious software, a weight value corresponding to the key indicator "malicious software" is zero, and a first assessment result corresponding to the key indicator "malicious software" is a dangerous state. If the mobile does not have any malicious software, a weight value corresponding to the key indicator "malicious software" is 30, and a first assessment result corresponding to the key indicator "malicious software" is a security state.

Correspondingly, the assessment policies corresponding to the key indicator "malicious software" are obtained according to the prestored corresponding relationship between each key indicator and the assessment policies corresponding to each key indicator. According to the state information corresponding to the key indicator "malicious software", the number of the malicious software is detected to be three, and the first assessment result corresponding to the key indicator "malicious software" is the dangerous state according to corresponding assessment policies, and the key indicator "malicious software" is endowed with a weight value of zero.

The assessment policies corresponding to the key indicator "power management" include a plurality of electronic quantity ranges. Each electronic quantity range is corresponding to a fraction and a first assessment result. Supposing that the assessment policies corresponding to the key indicator "power management" include five electronic quantity ranges. The five electronic quantity ranges includes: a first electronic quantity range, a second electronic quantity range, a third electronic quantity range, a fourth electronic quantity range, and a fifth electronic quantity range. The first electronic quantity range is [80%, 100%], the weight value corresponding to the first electronic quantity range [80%, 100%] is 5, and the first assessment result corresponding to the first electronic quantity range [80%, 100%] is a security state. The second electronic quantity range is [60%, 79%], the weight value corresponding to the second electronic quantity range [60%, 79%] is 4, and the first assessment result corresponding to the second electronic quantity range [60%, 79%] is a security state. The third electronic quantity range is [40%, 59%], the weight value corresponding to the third quantity range [40%, 59%] is 3, and the first assessment result corresponding to the third electronic quantity range [40%, 59%] is a security state. The fourth electronic quantity range is [20%, 39%], a weight value corresponding to the fourth electronic quantity range [20%, 39%] is 2, and the first assessment result corresponding to the fourth electronic quantity range [20%, 39%] is a warning state.

Correspondingly, the assessment policies corresponding to the key indicator "power management" are obtained according to the prestored corresponding relationship between each key indicator and the assessment policies corresponding to each key indicator. According to the state information corresponding to the key indicator "power management", the electronic quantity range of the power management is detected to be 60%, and the first assessment result corresponding to the key indicator "power management" is the security state according to corresponding assessment policies, and the key indicator "power management" is endowed with a weight value of 4.

The assessment policies corresponding to the key indicator "Bluetooth state" are defined as follows. If the Bluetooth state of the mobile terminal is an open state, a weight value corresponding to the key indicator "Bluetooth state" is zero, and a first assessment result corresponding to the key indicator "Bluetooth state" is a warning state. If the Bluetooth state of the mobile terminal is a closed state, a weight value corresponding to the key indicator "Bluetooth state" is 5, and a first assessment result corresponding to the key indicator "Bluetooth state" is a security state.

Correspondingly, the assessment policies corresponding to the key indicator "Bluetooth state" are obtained according to the prestored corresponding relationship between each indicator and the assessment policies corresponding to each key indicator. According to the state information corresponding to the key indicator "Bluetooth state", the Bluetooth state of the mobile terminal is detected to be an open state, and the first assessment result corresponding to the key indicator "Bluetooth state" is the warning state according to corresponding assessment policies, and the key indicator "Bluetooth state" is endowed with a weight value of zero.

Step 203, conducting an overall level assessment on the overall security state of the mobile terminal to acquire a second assessment result which expresses the overall security state of the mobile terminal according to the weight value of each of the key indicators and the first assessment result of each of the indicators included in the key indicator list.

Technical person and/or the user can assign one or more than one key indicators in the key indicator list of the mobile terminal in advance. In detail, the first assessment result of the key indicator assigned in the key indicator list is determined, if there is a key indicator whose first assessment result is in a dangerous state in the key indicators assigned in the key indicator list, then the second assessment result expressing the overall security state of the mobile terminal is set to a dangerous state. If the key indicators assigned in the key indicator list include any key indicator whose first assessment result is in a warning state but not include the key indicator whose first assessment result is in the dangerous state, then the second assessment result expressing the overall security state of the mobile terminal is set to a warning state. If there is not any key indicator whose first assessment result is in the dangerous state and there is not any key indicator whose first assessment result is in the warning state in the key indicators assigned in the key indicator list, a calculation result of each key indicator is figured out according to the weight value of each key indicator and a weight coefficient corresponding to each key indicator. Then, all the calculation results of the key indicators are summed to acquire a score of the mobile terminal, and the score range which the score of the mobile terminal belongs to is determined, the second assessment result corresponding to the score range is acquired, and the second assessment result corresponding to the score range is served as a second assessment result which is used to express the overall security state of the mobile terminal.

Furthermore, if the second assessment result expressing the overall security state of the mobile terminal is directly set according to the first assessment result of the key indicators assigned in the key indicator list, after the second assessment result expressing the overall security state of the mobile terminal is set, a calculation result of each key indicator is figured out according to the weight value of each key indicator and the weight coefficient corresponding to each key indicator. Then, all the calculation results of the key indicators are summed to acquire a score of the mobile terminal.

A corresponding relationship between the score range and the second assessment result is predefined, therefore, according to the score range, the second assessment result corresponding to the score range can be obtained based on the corresponding relationship between the score range and the second assessment result.

An operation that a calculation result of each key indicator is figured out according to the weight value of each key indicator and the weight coefficient corresponding to each key indicator can be described in detail: the calculation result of each key indicator is acquired by making a multiplication operation between the weight value of each key indicator and the weight coefficient corresponding to each key indicator.

Technical person and/or the user appoint(s) the key indicators which play an important function to the security and the stability of the mobile terminal. If the first assessment result of the key indicator has the dangerous state or the warning state, which will cause great influence to the security and the stability of the mobile terminal, therefore, the second assessment result which expresses the overall security state of the mobile terminal can be directly set to a dangerous state and/or a warning state.

For example, the key indicators "software in running", "junk file", and "malicious software" are assigned in the key indicator list in advance in the table 1, and the first assessment result of each of the key indicators "software in running", "junk file", and "malicious software" is determined respectively. If the first assessment result of the key indicator "malicious software" is determined to be in the dangerous state, then the second assessment result expressing the overall security state of the mobile terminal can be set to in the dangerous state.

The weight coefficient corresponding to each key indicator in the table 1 is preset as 1. Furthermore, the calculation result can be figured out to be 24 according to the weight value 24 of the key indicator "software in running" and the weight coefficient 1 (namely, by making a multiplication operation between the weight value 24 and the weight coefficient 1). The calculation result can be figured out to be 30 according to the weight value 30 of the key indicator "junk file" and the weight coefficient 1. The calculation result can be figured out to be 0 according to the weight value 0 of key indicator "malicious software" and the weight coefficient 1. The calculation result can also be figured out according to the weight value 4 of the key indicator "power management" and the weight coefficient 1. The calculation result can be figured out to be 0 according to the weight value 0 of the key indicator "Bluetooth state" and the weight coefficient 1. A summation operation of the calculation result 24 of the key indicator "software in running", the calculation result 30 of the key indicator "junk file", the calculation result 0 of the key indicator "malicious software", the calculation result 4 of the key indicator "power management", and the calculation result 0 of the key indicator "Bluetooth state" is performed, to obtain a score 60 of the mobile terminal, that is, the calculation result 24 of the key indicator "software in running", the calculation result 30 of the key indicator "junk file", the calculation result 0 of the key indicator "malicious software", the calculation result 4 of the key indicator "power management", and the calculation result 0 of the key indicator "Bluetooth state" is summed to obtain a score of the mobile terminal to be 60.

Step 204, displaying the second assessment result which expresses the overall security of the mobile terminal and the state information of each key indicator, and further displaying the score of the mobile terminal.

Furthermore, if the second assessment result which expresses the overall security of the mobile terminal is the dangerous state or the warning state, then an prompting message corresponding to the second assessment result which expresses the overall security of the mobile terminal is acquired, and is displayed.

Corresponding prompting messages can be preset for the dangerous state and the warning state, and be stored. The prompting message is configured to remind the user to process the mobile terminal, so as to recover the mobile terminal to a security state. For example, for the dangerous state, the prompting message corresponding to the dangerous state can be preset to be "processing immediately", which remind the user to deal with the mobile terminal immediately.

Furthermore, the first assessment result of each key indicator is displayed.

For example, referring to FIG. 3, the second assessment result which expresses the overall security state of the mobile is the dangerous state, the score of the mobile terminal is 60, the prompting message is "processing immediately", and the state information about each key indicator is displayed.

In the embodiment, a processing strategy corresponding to each key indicator in the key indicator list is predefined, and each key indicator and the processing strategy corresponding to each key indicator are stored into a corresponding relationship between the key indicator and the processing strategy.

When the user selects the key indicator which needs to be processed, and submits a processing command, the processing strategy corresponding to the key indicator is acquired from the corresponding relationship between the key indicator and the processing strategy. The user can perform a processing operation according to the state information about the key indicator and the processing strategy, to recover the state information of the key indicator to the security state.

For example, if the user selects the key indicator "junk file" as the key indicator which needs to be processed and submits a corresponding processing command, then the processing strategy corresponding to the key indicator "junk file" is acquired from the corresponding relationship between the key indicator and the processing strategy. The junk files are cleaned according to the processing strategy and the state information of the key indicator "junk file", and 39 MB of storage space occupied by the junk files is released.

Referring to FIG. 4, if the user selects the key indicator "malicious software" as the key indicator which needs to be processed and submits a corresponding processing command, the specific malicious software is displayed. Supposing that the malicious software includes: first malicious software, second malicious software, and third malicious software. The processing strategy corresponding to the key indicator "malicious software" is acquired from the corresponding relationship between the key indicator and the processing strategy. The first malicious software, the second malicious software and the third malicious software is cleaned according to the state information of the key indicator "malicious software" and the processing strategy.

If the user selects the key indicator "power management" as the key indicator which needs to be processed and submits a corresponding processing command, the processing strategy corresponding to the key indicator "power management" is acquired from the corresponding relationship between the key indicator and the processing strategy. The first assessment of the key indicator "power management" is the warning state, then the mobile terminal is set to a power saving mode according to the processing strategy acquired from the corresponding relationship between the key indicator and the processing strategy.

After the key indicators which need to be processed are processed by the user, a detection command can be submitted. Accordingly, the detection command is received, and the above-described steps 201 to 204 are implemented again to acquire the second assessment which is used to express the overall security state of the mobile terminal.

In the embodiment of present disclosure, each key indicator included in the key indicator list of the mobile terminal is detected, to acquire the state information about each key indicator. According to the state information of the key indicator, the first assessment result and the weight value are acquired through the assessment policies corresponding to each key indicator. The second assessment result which expresses the overall security of the mobile terminal is acquired according to the first assessment result and the weight value of the key indicator. Thus, the second assessment result which is used to express the overall security of the mobile terminal is automatically acquired according to the weight value of each key indicator and the first assessment result of each indicator, not only the overall security state of the mobile terminal is accurately acquired, but also the user experience is improved.

A Third Embodiment

Figure 5:
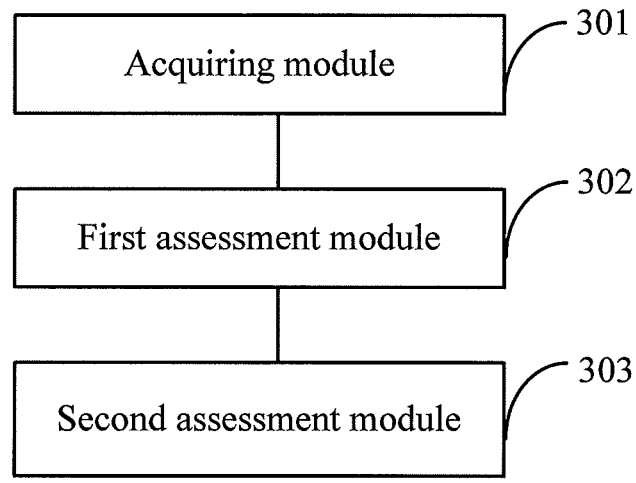
FIG. 5 is a schematic diagram of a device for acquiring security state of a mobile terminal provided in a third embodiment.

Referring to FIG. 5, FIG. 5 is a schematic diagram of a device for acquiring security state of a mobile terminal provided in a third embodiment. The device for acquiring security state of mobile terminal includes the following modules.

An acquiring module 301 is configured to acquire state information about key indicators preset by a mobile terminal.

A first assessment module 302 is configured to conduct a security level assessment on each key indicator through assessment policies corresponding to each of the key indicators, to obtain a first assessment result, according to the state information about the key indicators.

A second assessment module 303 is configured to endow each key indicator with a specific weight value, conduct an overall level assessment on the overall security state of the mobile terminal to acquire a second assessment result which expresses the overall security state of the mobile terminal according to the weight value of each of the key indicators and the first assessment result of each of the key indicators.

The second assessment module 303 includes the following unites.

An endowing unit is configured to endow each key indicator with a specific weight value.

A first setting unit is configured to determine the first assessment result of each key indicator which is pre-appointed, set the second assessment result which expresses the overall security state of the mobile terminal to a dangerous state, if there is a key indicator whose first assessment is in a dangerous state in the key indicators assigned in the key indicator list.

A second setting unit is configured to set the second assessment result which expresses the overall security state of the mobile terminal to a warning state, if the key indicators assigned in the key indicator list include any key indicator whose first assessment result is in a warning state but not include the key indicator whose first assessment result is in the dangerous state.

An acquiring unit is configured to acquire a second assessment result which expresses the overall security state of the mobile terminal according to the weight value of each of the key indicators assigned in the key indicator list, if the key indicators assigned in the key indicator list do not include any key indicator whose first assessment result is in a dangerous state and do not include any key indicator whose first assessment result is in a warning state.

The acquiring unit includes the following sub-units.

A calculating sub-unit is configured to figure out a calculation result of each key indicator according to the weight value of each key indicator and a weight coefficient corresponding to each key indicator, and acquire a score of the mobile terminal by summing all the calculation results of the key indicators.

A setting sub-unit is configured to determine a score range which the score of the mobile terminal belongs to, acquire the second assessment result corresponding to the score range, and set the second assessment result corresponding to the score range to a second assessment result which is used to express the overall security state of the mobile terminal.

Furthermore, the device includes the following module.

A displaying module is configured to display the second assessment result which expresses the overall security of the mobile terminal and the state information of each key indicator.

Furthermore, the device includes the following module.

A processing module is configured to acquire the processing strategy corresponding to the key indicator from a prestored corresponding relationship between the key indicator and the processing strategy, when the user selects the key indicator which needs to be processed, and submit a processing command.

In the embodiment of present disclosure, each key indicator of a key indicator list of a mobile terminal is detected, to acquire state information of each key indicator. The first assessment result of each key indicator according to the state information about the key indicators and the weight value are acquired through the assessment policies corresponding to the key indicator, according to the state information about the key indicators. The second assessment result which expresses the overall security of the mobile terminal is acquired according to the weight value of each of the key indicators and the first assessment result of each of the indicators included in the key indicator list. In the present disclosure, the second assessment result is automatically acquired according to the weight value of each of the key indicators, so that, the overall security state of the mobile terminal is accurately acquired, and the user experience is improved.

A Fourth Embodiment

Figure 6:
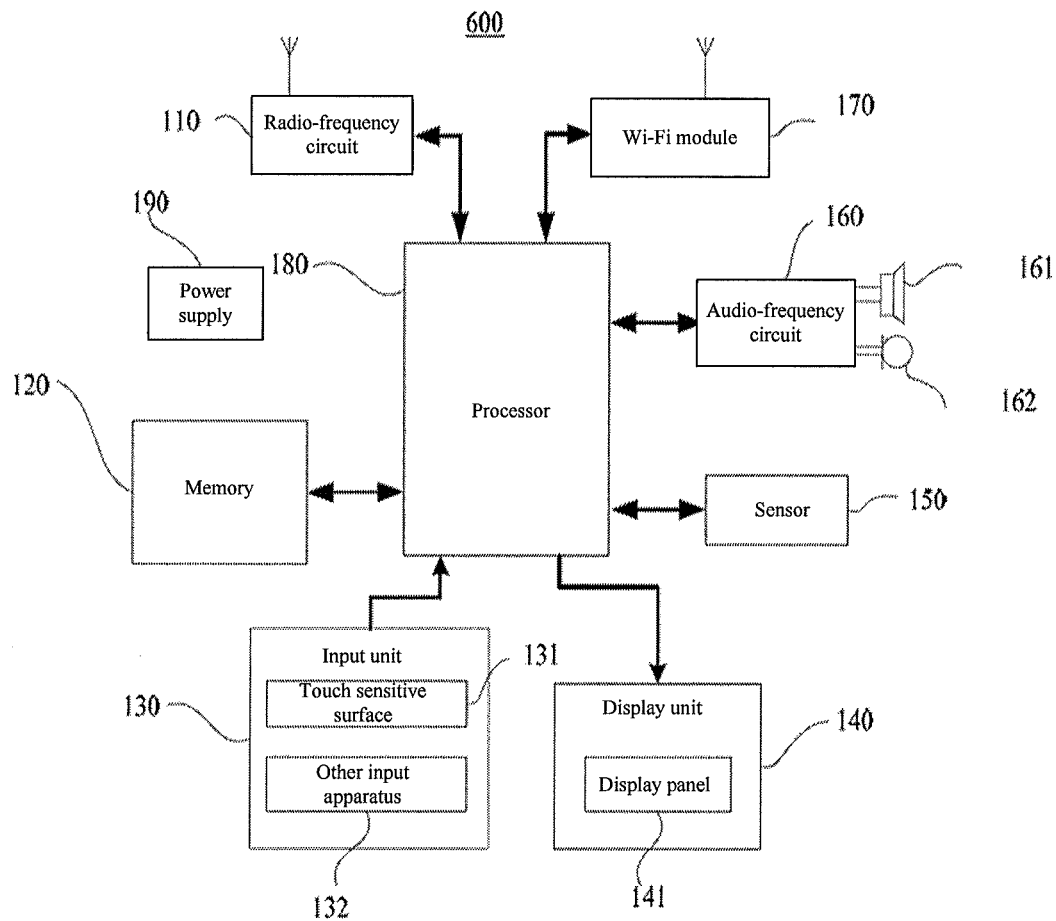
FIG. 6 is a schematic diagram of an apparatus provided in a fourth embodiment of present disclosure.

Referring to FIG. 6, FIG. 6 is a schematic diagram of an apparatus provided in a fourth embodiment of present disclosure. The apparatus can be configured to implement the method for acquiring security state of mobile terminal. The apparatus is described in detail as follows.

A apparatus 600 can include a radio-frequency (RF) circuit 110, a memory 120 including one or more than one computer readable storage medium, an input unit 130, a display unit 140, a sensor 150, an audio-frequency circuit 160, a Wireless Fidelity (Wi-Fi) module 170, a processor 180 including one or more than one processing cores, a power supply 190, and etc. A personal having ordinal skills in the art can realize that the apparatus can not be limited to the terminal as shown in FIG. 6. The apparatus can includes more components than the apparatus as shown in FIG. 6, or the apparatus can include fewer components than the apparatus as shown in FIG. 6. Some components can be combined into a component, or some components can be located in different position. The component of the apparatus 600 is described in detail as follows.

The radio-frequency circuit 110 is configured to receive messages or send messages, or receive or send signals during a voice conversation. Especially, after the radio-frequency circuit 110 receives an up message of a base station, the radio-frequency circuit 110 sends the up message to one or more than one processor 180, and sends down data to the base station. The radio-frequency circuit 110 servers as a communication unit, and the radio-frequency circuit 110 includes but not limited to an antenna, at least an amplifier, a tuner, one or more than one oscillators, a subscriber identification module (SIM) card, a transceiver, a coupler, a low noise amplifier (LNA), a duplexer, and etc. Furthermore, the radio-frequency circuit 110 can communicate with other apparatus through a wireless communication manner. The wireless communication manner can be any one communication standard or communication protocol, the wireless communication includes but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), and etc. The memory 120 is configured to store software programs and modules. The memory 120 implements various kind of function applications and data processing by running the software programs and modules stored in the memory 120. The memory 120 mainly includes a program storing area and a data storing area. The program storing area can store an operating system, at least an application program being need by a function application (such as a voice playing function application, an image playing function application), and etc. The data storing area can store data (such as audio data, telephone book) established by a usage of the apparatus 600. Furthermore, the storage 120 can include a high speed random access memory and a nonvolatile memory. The nonvolatile memory can be a disk memory, a flesh memory, or other nonvolatile solid-state memory. Correspondingly, the storage 120 can also include a storage controller and the storage controller is provided for accessing the processor 180 and the input unit 130.

The input unit 130 is configured to receive data or character input by a user and generate an input signal of a key board, a mouse, an operating arm, an optical ball or a track ball. The input signal is related to the user and a function control. In detail, the input unit 130 includes a touch sensitive surface 131 and other input apparatus 132. The touch sensitive surface 131 is also named touch screen or a touch panel. The touch sensitive surface 131 can receive a touch operation of the user on or near the touch sensitive surface 131. For example, the user makes the touch operation by using a figure, a stylus, or other object or accessory on or near the touch sensitive surface 131. The touch operation is configured to drive a corresponding connecting apparatus according to a preset program. Alternatively, the touch sensitive surface 131 can include two parts: a touch detecting apparatus and a touch controller. The touch detecting apparatus detects a touch position of the user and a touch signal generated by the touch operation, and sends the touch signal to the touch controller. The touch controller receives the touch signal sent by the touch detecting apparatus, converts the touch signal into a contact coordinate, and sends the contact coordinate to the server processor 180. Furthermore, the touch controller also can receive a command sent by the processor 180 and implement the command. The touch sensitive surface 131 can be a resistive touch screen, a capacitive touch screen, an infrared touch screen, a surface acoustic wave touch screen. Besides the touch sensitive surface 131, the input unit 130 further includes other input apparatus 132. In detail, the other input apparatus 132 can include but not limited to a or a combination of a physical keyboard, a function button (such as, a volume control button, a switch button), a track ball, a mouse, an operating arm.

The display unit 140 is configured to display the information input by the user or the information provided to the user, and various graphics user interfaces of the apparatus 600. The various graphics user interfaces can be a graph, a text, an icon, a video, or any combination of the graph, the text, the icon, and the video. The display unit 140 can include a display panel 141. Alternatively, the display panel 141 can be a liquid crystal display (LCD) panel, or an organic light-emitting diode (OLED) panel. Furthermore, the touch sensitive surface 131 can cover the display panel 141. When the touch sensitive surface 131 detects a touch operation on or near the touch sensitive surface 131, the touch sensitive surface 131 sends the touch operation to the processor 180 to determine a type of the touch operation. Thereafter, the processor 180 provides corresponding visual output according to the type of the touch operation. Although the touch sensitive surface 131 and the display panel 141 are two individual components for respectively implementing an input function and an output function as shown in FIG. 6. In other embodiment, the touch sensitive surface 131 and the display panel 141 are integrated to implement an input and output function.

The apparatus 600 includes at least one sensor 150. The sensor 150 can be an optical sensor, a motion sensor, or other sensor. In detail, the optical sensor can include an ambient light sensor and a proximity sensor. The ambient light sensor can adjust a lightless of the display panel 141 according to the light and shade of the ambient light. When the terminal is moved to the user, such as move to an ear of the user, the proximity sensor can close the display panel 141 and/or back light module. As one kind of motion sensor, a gravity acceleration sensor can detect an accelerated speed of each direction (usually three axis directions). When the gravity acceleration sensor is in static state, the gravity acceleration sensor detects a value and a direction of the gravity, and the value and the direction of the gravity are used to an application of distinguishing mobile phone. The application can be an application of switching vertical screen, a game application, an application of a magnetometer pose calibration, an application for vibration identification (such as pedometer, tunk). The apparatus 600 can also include a gyroscope, a barometer, a hygrometer, a thermometer, an infrared sensor, and other sensor, and it is not repeated here.

The audio-frequency circuit 160, a speaker 161, and a microphone 162 provide an audio interface between the user and the apparatus 600. The audio-frequency circuit 160 converts the audio data received into an electronic signal and transmits the electronic signal to the speaker 161. The speaker 161 converts the electronic signal into a sound signal and outputs the sound signal. On the other hand, the microphone 162 converts a sound signal received into an electronic signal. The audio-frequency circuit 160 receives the electronic signal, converts the electronic signal into audio data, and outputs the audio data to the processor 180. After the audio data is processed by the processor 180, the audio data is output to a terminal through the RF circuit 110. Or after the audio data is processed by the processor 180, the audio data is output to the memory 120 for a further processing. The audio-frequency circuit 160 may also include a headphone jack. The apparatus 600 communicates with a headphone through the headphone jack.

The apparatus 600 also includes a Wi-Fi module 170 for a wireless communication. The Wi-Fi technology is a wireless communication for a short distance. The apparatus 600 helps the user to receive or send the e-mail, browse webpage, and visit streaming media via the Wi-Fi module 170. The Wi-Fi module 170 provides a wireless broadband internet access for the user. Although the Wi-Fi module 170 is shown in FIG. 6, it is understood that the Wi-Fi module 170 is not a necessary component of the apparatus 600. The Wi-Fi module 170 can be omitted in a scope of not changing a nature of the present disclosure.

The processor 180 is a controlling center of the apparatus 600; the processor 180 connects to every part of the mobile phone via various interfaces and circuits. Each function of the apparatus 600 is implemented and data is processed by running or implementing software programs or modules stored in the memory 120 and calling the data stored in the memory 120, thus monitoring the mobile phone. Alternatively, the processor 180 can include one or more than one processing cores. Preferably, the processor 180 integrates an application processor, or a modulation and demodulation processor. The application processor mainly handles the operating system, the user interface, and the application programs. The modulation and demodulation processor mainly handles wireless communications. It is understood that the modulation and demodulation processor can not integrated into the processor 180.

The apparatus 600 also includes a power supply 190 (such as a battery). Preferably, the power supply 190 logically connects the processor 180 via a power management, thus a function of charge management, or a function of discharge management, or power management are realized via the power management. The power supply 190 also include one or more than one direct current (DC) power supply or alternating current (AC) power supply, a recharging system, a power fault detecting circuit, a power adapter, a DC-AC converter, a power status indicator, and etc.

The apparatus 600 can also include a camera, a Bluetooth module, and etc, although the camera and the Bluetooth module are not shown in the drawings. In a detailed embodiment, the display unit of the terminal is a touch screen, and the terminal also includes a memory. One or more than one programs are stored in the memory, and one or more than one programs are implemented by the one or more than one memories 180 to implement the method for acquiring security of mobile terminal as shown in FIG. 1 and the method for acquitting security of mobile terminal as shown in FIG. 2.

A computer readable storage medium is provided in yet another embodiment of present disclosure. The computer readable storage medium may be the computer readable storage medium included in the memory described in the above embodiment, or a signal computer readable storage medium which is not assembled into the terminal. The computer readable storage medium stores one or more than one programs, and the one or more than one programs are implemented by the one or more than one memories 180 to implement the method for acquiring security of mobile terminal as shown in FIG. 1 and the method for acquitting security of mobile terminal as shown in FIG. 2.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for acquiring security state of mobile terminal, comprising:
    acquiring state information about key indicators preset by a mobile terminal, wherein the key indicators comprise "software in running", "junk file", "malicious software", "power management", and "Bluetooth state";
    conducting a security level assessment on each key indicator through assessment policies corresponding to each of the key indicators, to obtain a first assessment result, according to the state information about the key indicators; and
    endowing each key indicator with a specific weight value, conducting an overall level assessment on the overall security state of the mobile terminal, and acquiring a second assessment result which expresses the overall security state of the mobile terminal according to the weight value of each of the key indicators and the first assessment result of each of the key indicators;
    wherein the step of conducting an overall level assessment on the overall security state of the mobile terminal, and acquiring a second assessment result which expresses the overall security state of the mobile terminal according to the weight value of each of the key indicators and the first assessment result of each of the key indicators, comprises:
    determining the first assessment result of each key indicator which is pre-appointed, setting the second assessment result which expresses the overall security state of the mobile terminal to a dangerous state, if there is a key indicator whose first assessment is in a dangerous state in the key indicators assigned in the key indicator list;
    setting the second assessment result which expresses the overall security state of the mobile terminal to a warning state, if the key indicators assigned in the key indicator list include any key indicator whose first assessment result is in a warning state but not include the key indicator whose first assessment result is in a dangerous state; and
    acquiring a second assessment result which expresses the overall security state of the mobile terminal according to the weight value of each key indicator included in the key indicator list, if the key indicators assigned in the key indicator list do not include any key indicator whose first assessment result is in a dangerous state and do not include any key indicator whose first assessment result is in a warning state.

2. The method for acquiring security state of mobile terminal according to claim 1, wherein the step of acquiring a second assessment result which expresses the overall security state of the mobile terminal according to the weight value of each key indicator included in the key indicator list, comprises:
    figuring out a calculation result of each key indicator according to the weight value of each key indicator and a weight coefficient corresponding to each key indicator, and acquiring a score of the mobile terminal by summing all the calculation results of the key indicators; and
    determining a score range which the score of the mobile terminal belongs to, acquiring the second assessment result corresponding to the score range, and setting the second assessment result corresponding to the score range to a second assessment result which is used to express the overall security state of the mobile terminal.

3. The method for acquiring security state of mobile terminal according to claim 1, wherein after the step of acquiring a second assessment result which expresses the overall security state of the mobile terminal, the method further comprising:
    displaying the second assessment result which expresses the overall security of the mobile terminal and the state information of each key indicator.

4. The method for acquiring security state of mobile terminal according to claim 3, after the step of displaying the second assessment result which expresses the overall security of the mobile terminal and the state information of each key indicator, further comprising:
    acquiring the processing strategy corresponding to the key indicator from a prestored corresponding relationship between the key indicator and the processing strategy, when the user selects the key indicator which needs to be processed, and submitting a processing command.

5. An apparatus for acquiring security state of a mobile terminal, comprising:
    a memory;
    one or more than one programs stored in the memory for execution by one or more than one processors, the one or more than one programs comprising instructions for:
    acquiring state information about key indicators preset by a mobile terminal, wherein the key indicators comprise "software in running", "junk file", "malicious software", "power management", and "Bluetooth state";
    conducting a security level assessment on each key indicator through assessment policies corresponding to each of the key indicators, to obtain a first assessment result, according to the state information about the key indicators; and
    endowing each key indicator with a specific weight value, and conducting an overall level assessment on the overall security state of the mobile terminal, and acquiring a second assessment result which expresses the overall security state of the mobile terminal according to the weight value of each of the key indicators and the first assessment result of each of the key indicators;
    wherein conducting an overall level assessment on the overall security state of the mobile terminal, and acquiring a second assessment result which expresses the overall security state of the mobile terminal according to the weight value of each of the key indicators and the first assessment result of each of the key indicators, comprises:

determining the first assessment result of each key indicator which is pre-appointed, setting the second assessment result which expresses the overall security state of the mobile terminal to a dangerous state, if there is a key indicator whose first assessment is in a dangerous state in the key indicators assigned in the key indicator list;

setting the second assessment result which expresses the overall security state of the mobile terminal to a warning state, if the key indicators assigned in the key indicator list include any key indicator whose first assessment result is in a warning state but not include the key indicator whose first assessment result is in a dangerous state; and acquiring a second assessment result which expresses the overall security state of the mobile terminal according to the weight value of each key indicator included in the key indicator list, if the key indicators assigned in the key indicator list do not include any key indicator whose first assessment result is in a dangerous state and do not include any key indicator whose first assessment result is in a warning state.

6. The apparatus for acquiring security state of a mobile terminal according to claim 5, wherein the step of acquiring a second assessment result which expresses the overall security state of the mobile terminal according to the weight value of each key indicator included in the key indicator list, comprises:

figuring out a calculation result of each key indicator according to the weight value of each key indicator and a weight coefficient corresponding to each key indicator, and acquiring a score of the mobile terminal by summing all the calculation results of the key indicators; and determining a score range which the score of the mobile terminal belongs to, acquiring the second assessment result corresponding to the score range, and setting the second assessment result corresponding to the score range to a second assessment result which is used to express the overall security state of the mobile terminal.

7. The apparatus for acquiring security state of a mobile terminal according to claim 5, wherein after the step of acquiring a second assessment result which expresses the overall security state of the mobile terminal, the method further comprising:

displaying the second assessment result which expresses the overall security of the mobile terminal and the state information of each key indicator.

8. The apparatus for acquiring security state of a mobile terminal according to claim 7, after the step of displaying the second assessment result which expresses the overall security of the mobile terminal and the state information of each key indicator, further comprising:

acquiring the processing strategy corresponding to the key indicator from a prestored corresponding relationship between the key indicator and the processing strategy, when the user selects the key indicator which needs to be processed, and submitting a processing command.

9. The method for acquiring security state of mobile terminal according to claim 1, wherein the state information about the key indicator "software in running" comprises a number of the software running in the mobile terminal;

the state information about the key indicator "junk file" comprises the storage space occupied by junk files;

the state information about the key indicator "malicious software" comprises a number of the malicious software;

the state information about the key indicator "power management" comprises a state of charge of a battery of the mobile terminal;

the state information about the key indicator "Bluetooth state" comprises the Bluetooth of the mobile terminal is in an open state or in a closed state;

the assessment policy corresponding to the key indicator "software in running" comprises a plurality of number ranges; each number range corresponding to a weight value and a first assessment result;

the assessment policy corresponding to the key indicator "junk file" comprises a plurality of storage space ranges, each storage space range corresponding to a weight value and a first assessment result;

the assessment policy corresponding to the key indicator "malicious software" comprises: if the mobile terminal has malicious software, a weight value corresponding to the key indicator "malicious software" is zero, and a first assessment result corresponding to the key indicator "malicious software" is a dangerous state; if the mobile does not have any malicious software, a weight value corresponding to the key indicator "malicious software" is set to a first predetermined value, and a first assessment result corresponding to the key indicator "malicious software" is a security state;

the assessment policy corresponding to the key indicator "power management" comprises a plurality of electronic quantity ranges, each electronic quantity range corresponding to a fraction and a first assessment result;

the assessment policy corresponding to the key indicator "Bluetooth state" comprises: if the Bluetooth state of the mobile terminal is an open state, a weight value corresponding to the key indicator "Bluetooth state" is zero, and a first assessment result corresponding to the key indicator "Bluetooth state" is a warning state; if the Bluetooth state of the mobile terminal is a closed state, a weight value corresponding to the key indicator "Bluetooth state" is set to be a second predetermined value, and a first assessment result corresponding to the key indicator "Bluetooth state" is a security state.

10. The method for acquiring security state of mobile terminal according to claim 9, wherein the assessment policy corresponding to the key indicator "software in running" comprises a first number range, a second number range, a third number range, a fourth number range, and a fifth number range, the first number range is [0, 3], the weight value corresponding to the first number range [0, 3] is 30, and the first assessment result corresponding to the first number range [0, 3] is a security state;

the second number range is [4, 7], the weight value corresponding to the second number range [4, 7] is 24, and the first assessment result corresponding to the second number range [4, 7] is a security state;

the third number range is [8, 9], the weight value corresponding to the third number range [8, 9] is 18, and the first assessment result corresponding to the third number range [8, 9] is a warning state;

the fourth number range is [10, 12], the weight value corresponding to the fourth number range [10, 12] is 12, and the first assessment result corresponding to the fourth number range [10, 12] is a warning state;

the fifth number range is greater than or equal to 13, the weight value corresponding to the fifth number range is 6, and the first assessment result corresponding to the fifth number range is a dangerous state.

11. The method for acquiring security state of mobile terminal according to claim 10, wherein the assessment policy corresponding to the key indicator "junk file" comprises a first storage space range, a second storage space range, and a third storage space range, the first storage space range is [0, 50M], the weight value corresponding to the first storage space range [0, 50M] is 30, and the first assessment result corresponding to the first storage space range [0, 50M] is a security state, the second storage space range is [51M, 150M], the weight value corresponding to the second storage space range [51M, 150M] is 20, and the first assessment result corresponding to the second storage space range [51M, 150M] is a warning state, the third storage space range is greater than or equal to 151M, the weight value corresponding to the third storage space range is 10, and the first assessment result corresponding to the third storage space range is a dangerous state.

12. The method for acquiring security state of mobile terminal according to claim 11, wherein the assessment policy corresponding to the key indicator "power management" comprises: a first electronic quantity range, a second electronic quantity range, a third electronic quantity range, a fourth electronic quantity range, and a fifth electronic quantity range, the first electronic quantity range is [80%, 100%], the weight value corresponding to the first electronic quantity range [80%, 100%] is 5, and the first assessment result corresponding to the first electronic quantity range [80%, 100%] is a security state, the second electronic quantity range is [60%, 79%], the weight value corresponding to the second electronic quantity range [60%, 79%] is 4, and the first assessment result corresponding to the second electronic quantity range [60%, 79%] is a security state, the third electronic quantity range is [40%, 59%], the weight value corresponding to the third quantity range [40%, 59%] is 3, and the first assessment result corresponding to the third electronic quantity range [40%, 59%] is a security state, the fourth electronic quantity range is [20%, 39%], a weight value corresponding to the fourth electronic quantity range [20%, 39%] is 2, and the first assessment result corresponding to the fourth electronic quantity range [20%, 39%] is a warning state.

13. The apparatus for acquiring security state of a mobile terminal according to claim 5, wherein the state information about the key indicator "software in running" comprises a number of the software running in the mobile terminal;
the state information about the key indicator "junk file" comprises the storage space occupied by junk files;
the state information about the key indicator "malicious software" comprises a number of the malicious software;
the state information about the key indicator "power management" comprises a state of charge of a battery of the mobile terminal;
the state information about the key indicator "Bluetooth state" comprises the Bluetooth of the mobile terminal is in an open state or in an closed state;
the assessment policy corresponding to the key indicator "software in running" comprises a plurality of number ranges; each number range corresponding to a weight value and a first assessment result;
the assessment policy corresponding to the key indicator "junk file" comprises a plurality of storage space ranges, each storage space range corresponding to a weight value and a first assessment result;
the assessment policy corresponding to the key indicator "malicious software" comprises: if the mobile terminal has malicious software, a weight value corresponding to the key indicator "malicious software" is zero, and a first assessment result corresponding to the key indicator "malicious software" is a dangerous state; if the mobile does not have any malicious software, a weight value corresponding to the key indicator "malicious software" is set to a first predetermined value, and a first assessment result corresponding to the key indicator "malicious software" is a security state;
the assessment policy corresponding to the key indicator "power management" comprises a plurality of electronic quantity ranges, each electronic quantity range corresponding to a fraction and a first assessment result;
the assessment policy corresponding to the key indicator "Bluetooth state" comprises: if the Bluetooth state of the mobile terminal is an open state, a weight value corresponding to the key indicator "Bluetooth state" is zero, and a first assessment result corresponding to the key indicator "Bluetooth state" is a warning state; if the Bluetooth state of the mobile terminal is a closed state, a weight value corresponding to the key indicator "Bluetooth state" is set to a second predetermined value, and a first assessment result corresponding to the key indicator "Bluetooth state" is a security state.

14. The apparatus for acquiring security state of a mobile terminal according to claim 13, wherein
the assessment policy corresponding to the key indicator "software in running" comprises a first number range, a second number range, a third number range, a fourth number range, and a fifth number range, the first number range is [0, 3], the weight value corresponding to the first number range [0, 3] is 30, and the first assessment result corresponding to the first number range [0, 3] is a security state;
the second number range is [4, 7], the weight value corresponding to the second number range [4, 7] is 24, and the first assessment result corresponding to the second number range [4, 7] is a security state;
the third number range is [8, 9], the weight value corresponding to the third number range [8, 9] is 18, and the first assessment result corresponding to the third number range [8, 9] is a warning state;
the fourth number range is [10, 12], the weight value corresponding to the fourth number range [10, 12] is 12, and the first assessment result corresponding to the fourth number range [10, 12] is a warning state;
the fifth number range is greater than or equal to 13, the weight value corresponding to the fifth number range is 6, and the first assessment result corresponding to the fifth number range is a dangerous state.

15. The apparatus for acquiring security state of a mobile terminal according to claim 14, wherein the assessment policy corresponding to the key indicator "junk file" comprises a first storage space range, a second storage space range, and a third storage space range, the first storage space range is [0, 50M], the weight value corresponding to the first storage space range [0, 50M] is 30, and the first assessment result corresponding to the first storage space range [0, 50M] is a security state, the second storage space range is [51M, 150M], the weight value corresponding to the second storage space range [51M, 150M] is 20, and the first assessment result corresponding to the second storage space range

[51M, 150M] is a warning state, the third storage space range is greater than or equal to 151M, the weight value corresponding to the third storage space range is 10, and the first assessment result corresponding to the third storage space range is a dangerous state.

16. The apparatus for acquiring security state of a mobile terminal according to claim 15, wherein the assessment policy corresponding to the key indicator "power management" comprises: a first electronic quantity range, a second electronic quantity range, a third electronic quantity range, a fourth electronic quantity range, and a fifth electronic quantity range, the first electronic quantity range is [80%, 100%], the weight value corresponding to the first electronic quantity range [80%, 100%] is 5, and the first assessment result corresponding to the first electronic quantity range [80%, 100%] is a security state, the second electronic quantity range is [60%, 79%], the weight value corresponding to the second electronic quantity range [60%, 79%] is 4, and the first assessment result corresponding to the second electronic quantity range [60%, 79%] is a security state, the third electronic quantity range is [40%, 59%], the weight value corresponding to the third quantity range [40%, 59%] is 3, and the first assessment result corresponding to the third electronic quantity range [40%, 59%] is a security state, the fourth electronic quantity range is [20%, 39%], a weight value corresponding to the fourth electronic quantity range [20%, 39%] is 2, and the first assessment result corresponding to the fourth electronic quantity range [20%, 39%] is a warning state.

* * * * *